Figure 1:
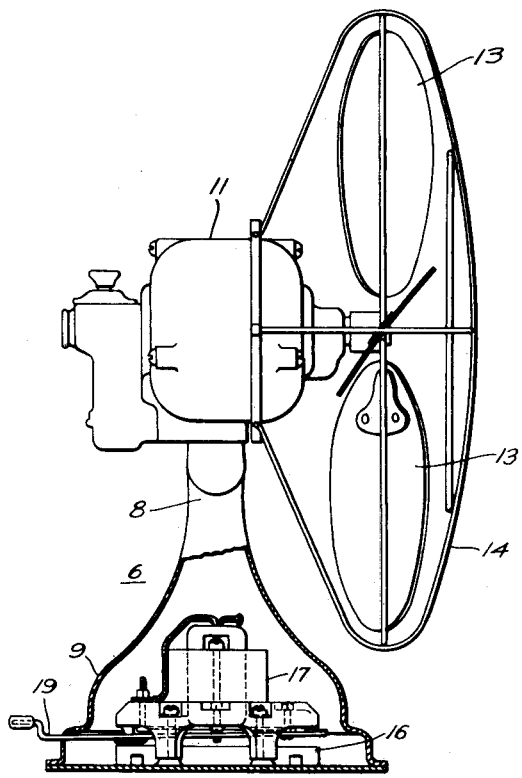

Aug. 31, 1937.　　　C. A. M. WEBER　　　2,091,665
CAPACITOR MOTOR
Filed Oct. 6, 1933

WITNESSES:
C. J. Weller.
Wm. C. Groome

INVENTOR
Clifford A. M. Weber.
BY O. D. Buchanan
ATTORNEY

Patented Aug. 31, 1937

2,091,665

UNITED STATES PATENT OFFICE 2,091,665

CAPACITOR MOTOR

Clifford A. M. Weber, Longmeadow, Mass., assignor to Westinghouse Electric & Manufacturing Company, East Pittsburgh, Pa., a corporation of Pennsylvania Application October 6, 1933, Serial No. 692,452

6 Claims. (Cl. 172—278)

My invention relates to capacitor-motor fans and the component parts thereof, that is, to desk fans, wall-bracket fans or ceiling fans which are equipped with capacitor motors.

An important object of my invention is to provide a variable-speed control, which is necessary in motors for fans of the type just mentioned, in conjunction with a capacitor motor, which is a single-phase, squirrel-cage or other induction motor having an auxiliary dephased primary winding which is energized with a capacitor in series circuit relation thereto, so as to obtain a polyphase starting effect.

Heretofore, induction-motor fans have commonly utilized an auxiliary dephased winding which was practically short circuited on itself, resulting in a very low efficiency, which, in turn, entailed the use of a relatively large motor. My invention overcomes this deficiency, producing a fan motor which is very much smaller than motors heretofore utilized for driving a given size of fan blade, such as a twelve-inch fan or a sixteen-inch fan. My improved design enables me to obtain a higher fan operating speed, lower watts input, and better speed control than is possible with the ordinary split-phase or shaded-pole type of motor which is now in general use.

Another feature of my invention is the disposition of the capacitor as well as the transformer or reactor which is utilized in my design, in the base of the pedestal, which very much improves the "balance" of the fan. All existing desk or bracket fans which were in use prior to my invention are more or less unbalanced when lifted in the normal way, that is, with the hand on the pedestal immediately below the motor. The motors of these previously existing designs are large and heavy and there is a tendency for the entire fan to wabble when being handled in the manner just described. In my capacitor-motor fan, the motor-weight is very much reduced, and this unbalanced effect, when handling, is practically removed, the small weight of the motor being effectively counter-balanced by the slightly additional weight placed in the pedestal.

A further object of my invention is to provide an improved design of a capacitor motor in which the effective number of turns of the auxiliary winding is lower than has heretofore been the practice in a standard design of capacitor motors.

With the foregoing and other objects in view, my invention consists in the circuits, apparatus, and methods herein after described and claimed and illustrated in the accompanying drawing, wherein:

Figure 1 is an elevational view of a fan embodying my invention, with the base of the pedestal partly broken away to show the parts disposed therewithin; and Figs. 2, 3, 4 and 5 are diagrammatic views of circuits and apparatus embodying my invention in a number of different forms of embodiment.

As shown in Fig. 1, my fan comprises a supporting pedestal 6 having a supporting column 8 and an enlarged base 9, a variable-speed, self-starting, single-phase induction motor 11 mounted on the supporting column 8 of the pedestal, and fan blades 13 driven by the motor and usually protected by a guard 14 which is attached to the motor-housing. In the base 9 of the pedestal I dispose a capacitor 16, an induction device 17 and a control device having an operating handle 19, said parts being connected and arranged in any of the ways shown in Figs. 2, 3, 4, or 5 of the drawing, or in any equivalent modification or any adaptation thereof.

With the construction just described, and illustrated in Fig. 1, it will be evident that I obtain not only a much smaller unit, from the point of view of appearance, as distinguished from the familiar designs which were on the market prior to my invention, but I also obtain a much better balanced unit; that is, when the fan is picked up with the hand grasping the supporting column 8 at the top of the pedestal, the top of the fan will not be as top-heavy as is the case in existing previous designs, and there will be almost as much weight on one side of the hand as on the other, so that it is easy to move the fan about without having it wabble excessively while being handled.

Figure 2:
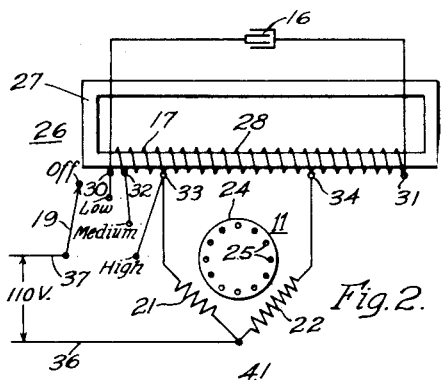

Fig. 2 shows the preferred electrical connections for a 110-volt fan. It will be observed that the induction motor 11 comprises a stator member having a main energizing winding 21 and an auxiliary winding or so-called "capacitor" winding 22, these two windings constituting the primary windings of the motor, the same being dephased from each other in space relationship, one winding being displaced approximately 90 electrical degrees, or one half of a pole pitch, from the other winding. The motor also has a rotor member 24 having closed-circuited secondary windings which are shown as comprising squirrel-cage windings 25.

In the embodiment of my invention shown in Fig. 2 it has been found economical to utilize a capacitor 16 which is designed for a somewhat higher voltage than 110 volts. In accordance with my invention, therefore, I utilize a combined means for both increasing the voltage applied to the capacitor 16 and controlling the speed of the motor 11. To this end I utilize a transformer 26 comprising a magnetizable core 27 which is provided with a single winding 28 having terminals 30 and 31 and having a plurality of intermediate taps 32, 33, and 34. The capacitor 16 is connected across the two end terminals 30, 31 of the transformer-winding so as to receive the maximum voltage of the transformer.

The two primary windings 21 and 22 of the motor are connected in two parallel circuits having one terminal in common, which is connected to one lead 36 of the 110-volt supply-circuit. The two free terminals of the main and auxiliary windings 21 and 22 are connected to the intermediate transformer taps 33 and 34, respectively, so that they are connected across an intermediate portion of the transformer-winding 28.

The end portion of the transformer-winding 28, between the main-winding tap 33 and the terminal 30 of the transformer-winding, is utilized as an induction device 17 for changing the voltages applied to both the main and auxiliary windings of the motor, thus changing the speed of the motor. To this end a switch is employed, the handle of which is indicated at 19, whereby the second terminal lead 37 of the 110-volt supply-circuit may be connected either to an "off" position or to any one of the taps 30, 32, or 33, in order to obtain low, medium or high speeds, respectively.

It will be noted that my induction device 30—33 for obtaining speed-control of the motor is mounted on the same magnetic core 27 as the transformer for stepping up the voltage applied to the capacitor, so that the voltage applied to the capacitor is changed at the same time that the voltage applied to the winding 21 is changed. It will also be observed that the phase relations between the line-voltage and the voltage-drop in my speed-controlling induction device 30—33 are materially different from the voltage relations which are obtained in the prior-art devices wherein inductors were utilized as the speed-changing device. This is so, because, in an inductor, which is an induction device in which only one voltage is produced or utilized, the voltage is necessarily approximately 90° behind the current in the device, whatever that current may be. In the prior-art motors, that current was the line-current which is supplied to the motor as a whole. The line-voltage is the vectorial sum of the main-winding voltage and the inductor-voltage, in these prior-art devices, and in order for this inductor-voltage to make the main-winding voltage less than the line-voltage, it was necessary for the line-current to lag behind the line-voltage, which it actually did, in an excessive degree.

In my device, however, I am able to utilize a motor which, under the conditions existing in at least one of the speed settings of the controller 19, has or may have a substantially unity power factor, so that the line-current is substantially in phase with the line-voltage. In a transformer, which is an induction device in which a plurality of voltages are produced or utilized, the voltage phase-relations are such that the voltage appearing across any portion of the transformer is substantially in phase with the voltage appearing across every other portion of the transformer, so that the voltage appearing across any given portion of the transformer does not bear any fixed phase relationship to the current which is carried by that portion of the transformer-winding.

In my device, as shown in Fig. 2, the voltage appearing across the transformer-winding 28 has a phase which is determined by the complex diagram shown but, in general, the effect of the capacitor 16 is to make the transformer-voltage vector incline at an acute angle with respect to the line-voltage vector, so that the transformer-voltage which is tapped off between the points 30 and 33 or 32 and 33 may be caused to operate subtractively or additively with respect to the line-voltage, in order to either decrease or increase the voltage appearing across the main motor-winding 21, according as an increase or a decrease in speed is desired. In the embodiment shown in Fig. 2, the connections are such as to produce a decrease in the motor-speed, by reason of the inclusion of a portion of the transformer winding 28 in series with the line-current which is fed to the motor.

It will be observed that, since a transformer is utilized as the means for bucking down the line-voltage so as to reduce the voltage applied to the main motor-winding 21, in the low-speed or medium-speed position of the controller 19, I am no longer limited to any particular phase relationship between the line-voltage and the line-current, so that I may utilize a motor having any desired power factor, in contradistinction from the prior-art motors which require a lagging power factor in order to make their reactors effective to reduce the motor-voltage.

In the motor as shown in Fig. 2, the voltage appearing across the capacitor 16 varies from 240 to 255 to 268 volts, as the controller-handle 19 is moved from low to medium to high-speed positions, respectively. At the same time, the main-winding voltage varies from about 74 to 87 to 110 volts, respectively, and the auxiliary-winding voltage varies from approximately 61 to 75 to 107 volts, the auxiliary-winding voltage leading the main-winding voltage by an angle which is somewhere in the neighborhood of 90°.

A feature of my motor which is a departure from practices which were common in the art, with respect to capacitor motors of this type, is that I utilize an auxiliary winding 22 having an unusually small number of effective turns. By the effective turns I mean the flux-producing turns, making allowance for the cross-sectional area of iron embraced by the respective turns. In the prior art, when an auxiliary winding has been utilized with a capacitor in series therewith, it has been a common practice to make the auxiliary winding have at least twice as many effective turns as the main winding, and in certain cases as much as five times the effective number of turns of the main winding. In my device, I prefer to utilize an auxiliary winding 22 having only about 180% of the effective number of turns of the primary winding 21. In this way the necessity for utilizing excessively fine wire for the auxiliary winding 22 is avoided.

It will be understood that while I have described my transformer-winding 28 as constituting a single winding, it will be true, in general, that different sizes of wire will be utilized for different portions of the transformer, as will be well understood by those skilled in the art. The porton of the transformer-winding 28 which carries the line current minus the capacitor current, that is, the portion between the taps 30 and 33, carries much heavier currents than the other portions of the transformer-winding and will thus be wound with the heavier wire.

Figure 3:
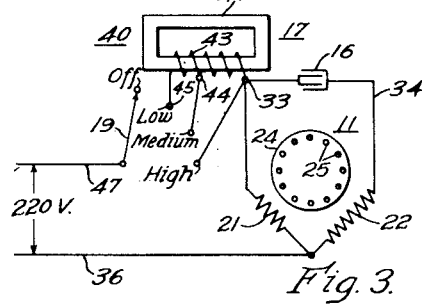

In Fig. 3 some of the important principles of my invention are applied to a 220-volt design in which it was not necessary to utilize a transformer for increasing the voltage applied to the capacitor 16. In this case the capacitor 16 is connected directly across the terminals 33 and 34 of the main and auxiliary windings 21 and 22, respectively, and an inductor 40 is utilized in place of the speed-changing transformer taps 30, 32, 33 of the Fig. 2 design. The inductor 40 comprises a magnetizable core 41 having a winding 43 which is tapped at an intermediate point 44 to provide three points 45, 44, and 33 for the low, medium and high-speed positions of the controller-handle 19, the controller being connected to one of the terminals 47 of the 220-volt supply circuit.

With the connections as shown in Fig. 3, while it is still necessary that the line-current shall lag behind the line-voltage if the inductor-voltages are to reduce the main-winding voltage in the low and medium-speed positions of the controller, it is, nevertheless, possible to make the power factor of the motor itself substantially unity, or much more nearly unity than in the prior art designs of fans which utilized the ordinary split-phase or shaded-pole type of motor. It will be observed that my invention, as shown in Fig. 3, utilizes an induction device (in the form of the inductor 40) which simultaneously varies the voltage on the capacitor 16 and the voltage on the main winding 21, so that desirable speed-control changes are effected, similarly to the results produced with the connection shown in Fig. 2.

Figure 4:
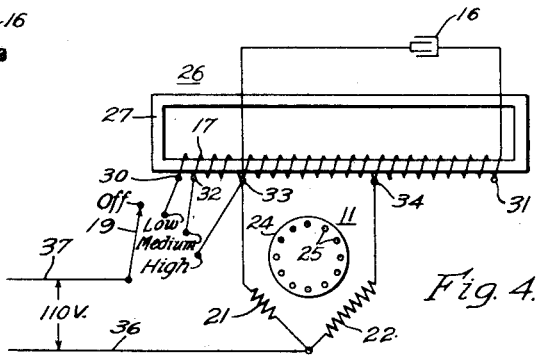

Fig. 4 shows a slight modification in the connections of Fig. 2, wherein one terminal of the capacitor 16, instead of being connected to the end terminal 30 of the transformer-winding, is connected to the main-winding terminal 33 of the transformer-winding. In order to have substantially the same voltages on the capacitor 16, it is necessary to increase the number of transformer-winding turns between the taps 34 and 31 by an amount which is substantially equal to the number of turns between the taps 30 and 33. Otherwise, the device shown in Fig. 4 is the same as that shown in Fig. 2, and the operation is substantially the same.

Figure 5:
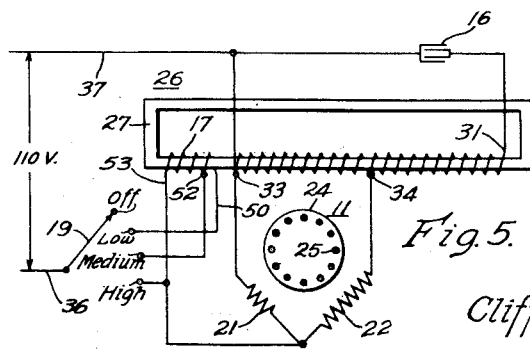

Fig. 5 shows a wiring connection which is substantially the same as that shown in Fig. 4, except that the portion of the transformer-winding which is connected in series with the line-current is connected in the 110-volt lead 36 instead of the 110-volt lead 37, and hence this portion of the transformer-winding must be wound as a separate winding, having separate terminals 50, 52, and 53 which are connected to the low-medium and high-speed positions of the controller-handle 19. The operation of the device of Fig. 5 is substantially the same as that of the devices shown in Figs. 2 and 4.

From the foregoing, it will be seen that, in each of the embodiments of my invention, I have provided a control-circuit in which there is a common, unbranched circuit-portion comprising the supply-lead 36 up to the junction-point of the two windings 21 and 22, and the supply-lead 37 (or 47) up to the junction point 33; and that between these two junction points, the circuit is divided, one branch-circuit portion including the main winding 21, and the other branch-circuit portion including the auxiliary winding 22 in series with either the capacitor 16 directly, as in Fig. 3, or the portion 33—34 of the transformer winding, as in Figs. 2, 4, and 5. It will be noted that the variable-speed control-mechanism is included, in each instance, in the common, unbranched circuit-portion, that is, in series with one of the supply-leads of the source of single-phase energy for the motor.

While I have illustrated my invention in several different modifications or embodiments, it is to be understood that my invention, in its broadest aspects, is not limited to these precise embodiments thereof, but that many changes and substitutions may be made by those skilled in the art without departing from the essential principles and spirit of my invention. I desire, therefore, that the appended claims shall be accorded the broadest construction consistent with their language when read in the light of the prior art.

I claim as my invention:

1. A variable-speed, self-starting induction motor adapted to be operated on single-phase alternating current, comprising, a stator member having dephased primary windings, and a rotor member having closed-circuited secondary windings, circuit-connections for cooperating with said primary windings to provide a common, unbranched circuit-portion and two branch-circuit portions for energizing the two primary windings, respectively, from a common single-phase source, a capacitor connected in series circuit relation to one of said branch-circuit portions, and an adjustable induction device separate from the motor-windings and in series circuit relation to the common, unbranched portion of the circuit.

2. A variable-speed, self-starting induction motor adapted to be operated on single-phase alternating current, comprising a stator member having dephased primary windings, and a rotor member having closed-circuited secondary windings, circuit-connections for cooperating with said primary windings to provide a common, unbranched circuit-portion and two branch-circuit portions for energizing the two primary windings, respectively, from a common single-phase source, a capacitor, an adjustable transformer, an adjustable portion of said transformer being connected in series circuit relation to the common, unbranched portion of the circuit, a constant portion of said transformer being connected in series circuit relation to one of the branch-circuit portions of the circuit, and a larger constant portion of said transformer being connected across said capacitor.

3. In combination, an induction motor having a rotor member, a stator member comprising a main energizing winding and an auxiliary energizing winding, an adjustable transformer, and a capacitor, one terminal of the main stator winding being permanently connected to one terminal of the auxiliary stator winding, the other terminals of the main and auxiliary stator windings being permanently connected, respectively, to two different points of the transformer, the capacitor being permanently connected across another portion of the transformer, a variable portion of the transformer being connected in series with both parallel circuits including the main and auxiliary stator windings.

4. A variable-speed, self-starting induction motor adapted to be operated on single-phase alternating current, comprising a stator member having dephased primary windings, and a rotor member having closed-circuited secondary windings, circuit-connections for cooperating with said primary windings to provide a common, unbranched circuit-portion and two branch-circuit portions for energizing the two primary windings, respectively, from a common single-phase source, a capacitor, a transformer having a single winding with a plurality of taps, the capacitor being connected across the entire transformer-winding, the two branches of said primary-winding circuit being connected to intermediate transformer-taps across an intermediate portion of the transformer-winding, and a switch for connecting one terminal of the source to any one of a plurality of taps on one of the end portions of the transformer-winding.

5. In combination, a variable-speed, self-starting induction motor adapted to be operated on single-phase alternating-current, having a rotor member, a stator member comprising a main energizing winding and an auxiliary energizing winding, the relative numbers of effective turns on the main and auxiliary energizing windings being in the ratio of approximately 5 to 9, circuit-connections for energizing the two stator windings in parallel from a common single-phase source, and means for producing a capacitive impedance effect, said means being connected in series circuit relation to the auxiliary energizing winding.

6. In combination, a variable-speed, self-starting induction motor adapted to be operated on single-phase alternating current, having a rotor member, a stator member comprising a main energizing winding and an auxiliary energizing winding, the relative numbers of effective turns on the main and auxiliary energizing windings being in the ratio of approximately 5 to 9, circuit-connections cooperating with said stator windings to provide a common, unbranched circuit-portion and two branch-circuit portions for energizing the two stator windings, respectively, in parallel from a common single-phase source, means for producing a capacitive impedance effect, said means being connected in series circuit relation to the auxiliary energizing windings, and a variable induction device separate from the stator windings and in series with the common, unbranched portion of the circuit.

CLIFFORD A. M. WEBER.